US010139827B2

(12) United States Patent
Charette et al.

(10) Patent No.: US 10,139,827 B2
(45) Date of Patent: Nov. 27, 2018

(54) DETECTING PHYSICAL THREATS APPROACHING A VEHICLE (71) Applicant: Ford Global Technologies, LLC, Dearborn, MI (US)

(72) Inventors: Francois Charette, Tracy, CA (US); Scott Vincent Myers, Camarillo, CA (US); Lisa Scaria, Milpitas, CA (US); Alexandru Mihai Gurghian, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/195,827

(22) Filed: Jun. 28, 2016

(65) Prior Publication Data

US 2017/0371339 A1  Dec. 28, 2017

(51) Int. Cl.
*G05D 1/02* (2006.01)
*B60R 21/12* (2006.01)
(Continued)

(52) U.S. Cl.
CPC ........... *G05D 1/0214* (2013.01); *B60R 21/12* (2013.01); *B60W 10/20* (2013.01); *B60W 10/30* (2013.01); *B60W 30/0956* (2013.01); *B60W 50/0098* (2013.01); *B60W 50/14* (2013.01); *G05D 1/0088* (2013.01); *B60W 2050/143* (2013.01);
(Continued)

(58) Field of Classification Search
None
See application file for complete search history.

(56) References Cited

U.S. PATENT DOCUMENTS 8,379,928 B2 * 2/2013 Kuoch ............... B60R 21/0134
340/436
9,014,905 B1 * 4/2015 Kretzschmar ......... G05D 1/021
701/28
(Continued)

FOREIGN PATENT DOCUMENTS

DE  102012223406 A1 * 12/2013 ............... G08G 1/16

OTHER PUBLICATIONS

Beauchemin et al., "The Computation of Optical Flow", University of Western Ontario—ACM Computing Surveys, vol. 27, No. 3, Sep. 1995.*

(Continued)

*Primary Examiner* — Tamara L Weber
(74) *Attorney, Agent, or Firm* — David R. Stevens; Stevens Law Group (57) ABSTRACT The present invention extends to methods, systems, and computer program products for detecting physical threats approaching a vehicle. External sensors on a vehicle capture the environment around the vehicle. Approaching targets detected by the external sensors can be fed into a neural network to recognize and/or classify approaching targets as potential threats. Tracking mechanisms (e.g., Kalman filters, Particle filters, etc.) can leverage temporal information to determine if a threat is approaching a vehicle. When an approaching threat is detected, a vehicle can activate one or more counter measures to deter the threat. When a vehicle includes autonomous driving capabilities, counter measures can include automatically attempting to drive away from an approaching threat.

20 Claims, 4 Drawing Sheets (51) Int. Cl.
  B60W 10/20 (2006.01)
  B60W 10/30 (2006.01)
  B60W 30/095 (2012.01)
  B60W 50/00 (2006.01)
  B60W 50/14 (2012.01)
  G05D 1/00 (2006.01)

(52) U.S. Cl.
  CPC ..... *B60W 2420/42* (2013.01); *B60W 2420/52* (2013.01); *B60W 2720/24* (2013.01); *G05D 2201/0213* (2013.01)

(56) References Cited

U.S. PATENT DOCUMENTS

| | | |
|---|---|---|
| 2006/0261931 A1 | 11/2006 | Cheng |
| 2008/0040004 A1 | 2/2008 | Breed |
| 2008/0144944 A1* | 6/2008 | Breed ............... G06K 9/00832 382/224 |
| 2008/0310737 A1* | 12/2008 | Han ..................... G06K 9/3241 382/224 |
| 2009/0010495 A1* | 1/2009 | Schamp ............ B60R 21/0134 382/106 |
| 2009/0087027 A1 | 4/2009 | Eaton |
| 2009/0324010 A1 | 12/2009 | Hou |
| 2011/0134245 A1 | 6/2011 | Khizhnichenko |
| 2014/0285667 A1 | 9/2014 | Aimura |
| 2014/0309870 A1* | 10/2014 | Ricci .................... H04W 48/04 701/36 |
| 2015/0191120 A1 | 7/2015 | Honda |
| 2017/0174227 A1* | 6/2017 | Tatourian ............ B60W 50/045 |

OTHER PUBLICATIONS

Szarvas et al., "Real-Time Pedestrian Detection Using LIDAR and Convolutional Neural Networks", Intelligent Vehicles Symposium, 2006 IEEE Meguro-Ku, Japan, Jun. 13-15, 2006, Piscataway, NJ, USA, IEEE LKND—DOI:10.1109/IVS.2006.1689630, pp. 213-218, Jun. 13, 2006.*

Garcia et al., "Distributed Pedestrian Detection Alerts Based on Data Fusion with Accurate Localization", Sensors, ISSN 1424-8220, Sep. 4, 2013 (Year: 2013).*

'Bike sense' research will tap drivers on the shoulder to prevent cycling accidents.

* cited by examiner

DETECTING PHYSICAL THREATS APPROACHING A VEHICLE

BACKGROUND

1. Field of the Invention

This invention relates generally to the field of vehicle occupant safety, and, more particularly, to detecting physical threats approaching a vehicle.

2. Related Art

A vehicle may be slowed down or stopped to permit a vehicle occupant (e.g., a driver or a passenger) to safely perform other activities not related to vehicle operation. For example, a driver may pull over and stop a vehicle to send a text, make a call, review a map, perform paperwork, etc. When stopped or moving at a slow speed, an occupant can more easily devote attention to the activity without endangering others (e.g., other vehicles, pedestrians, bikers, etc.) on a roadway. However, when a vehicle is stopped or moving at a slow speed (and even if the vehicle is not near a roadway), external dangers to the vehicle and/or occupants are still present. For example, other vehicles or persons can approach the vehicle with the intent to hard harm the vehicle and/or its occupants. When an occupant is performing another activity, the occupant's attention may be focused on the other activity. As such, the occupant may not perceive a hazard or threat approaching his or her vehicle.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for detecting physical threats approaching a vehicle. External sensors on a vehicle (e.g., a 360-degree camera) can be used to detect various hazardous situations. The external sensors can be used in situations when vehicle occupants are more vulnerable to attacks, such as, for example, when a vehicle is standing or driving at a slow speed. In one aspect, a camera is mounted on the roof of a vehicle to more fully capture the environment around the vehicle. A neural network can be used to detect approaching threats, such as, for example, a person wearing a mask, a person holding a weapon (knife or gun), a dog flashing teeth, etc.

More specifically, optical flow can be used to detect approaching targets in a 360-degree image. Approaching targets can be fed into a neural network to recognize and/or classify approaching targets as potential ambushes, attacks, etc. Tracking mechanisms (e.g., Kalman filters, Particle filters, etc.) can leverage temporal information to determine if a threat is approaching a vehicle.

When an approaching threat is detected, a vehicle can activate one or more counter measures to deter the threat. Counter measures can include one or more of: recording the approaching target, locking the doors, issuing an audible warning in the vehicle cabin, honking the horn, and flashing the lights. When a vehicle includes autonomous driving capabilities, the vehicle can automatically attempt to drive away from an approaching threat.

Figure 1:
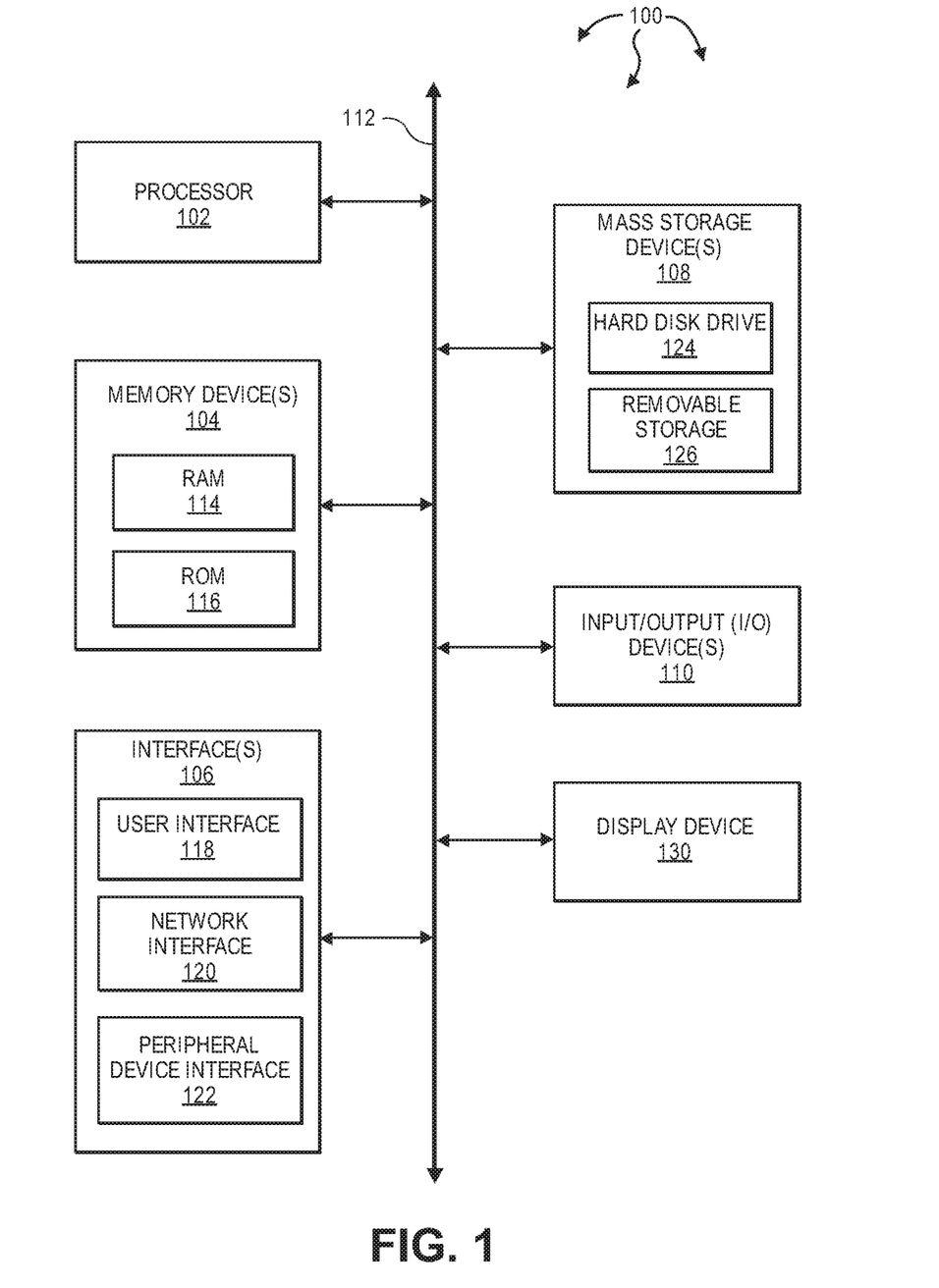
FIG. 1 illustrates an example block diagram of a computing device.

Aspects of the invention can be implemented in a variety of different types of computing devices. FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
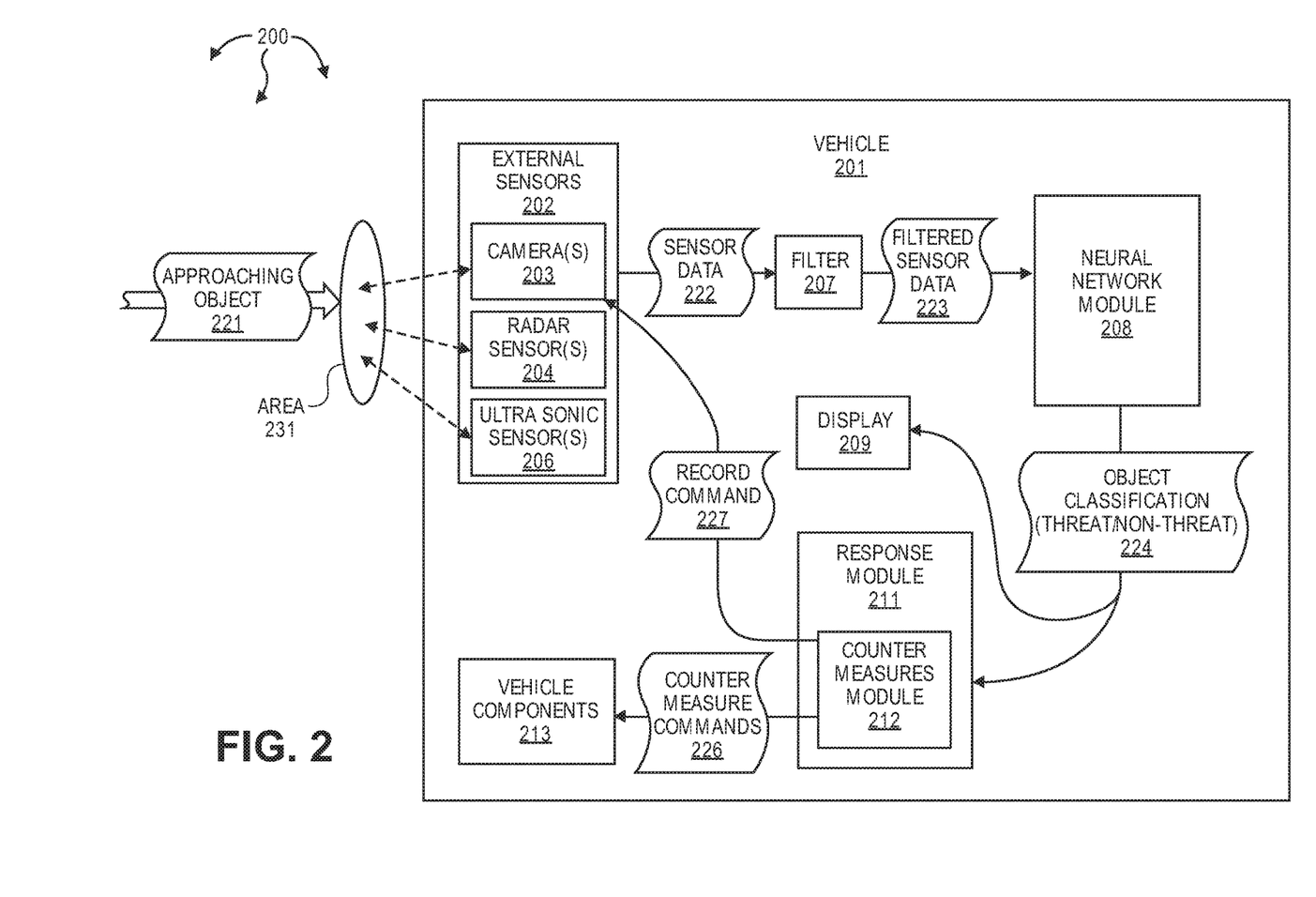
FIG. 2 illustrates an example environment that facilitates detecting physical threats approaching a vehicle.

FIG. 2 illustrates an example environment 200 that facilitates detecting physical threats approaching a vehicle. Environment 200 includes vehicle 201, such as, for example, a car, a truck, a bus, or a motorcycle. Vehicle 201 can contain a driver (not shown) and possibly one or more other occupants (not shown). Vehicle 201 can include a plurality of doors (e.g., two doors or four doors). Environment 200 also includes approaching object 221, such as, for example, a person, an animal, an object being carried by a person, etc.

Vehicle 201 includes external sensors 202, filter 207, neural network 208, display 209, response module 211, and vehicle components 213. External sensors 202 are mounted externally on vehicle 201. External sensors 202 include camera(s) 203, radar sensor(s) 204, and ultrasonic sensor(s) 206. External sensors 202 can also include other types of sensors (not shown), such as, for example, acoustic sensors, LIDAR sensors, and electromagnetic sensors. External sensors 202 can monitor objects in the vicinity of vehicle 201. External sensors 202 can output sensor data indicating the position and optical flow (i.e., direction and speed) of monitored objects. From sensor data, vehicle 201 can determine if an object is approaching vehicle 201.

Filter 207 (e.g., a Kalman filter, a Particle filter, etc.) can access sensor data output by external sensors 202. Filter 207 can formulate filtered sensor data by retaining sensor data for objects that are approaching vehicle 201 and filtering out sensor data for objects that are not approaching vehicle 201. Sensor data for objects not approaching vehicle 201 (e.g., objects having a path unlikely to intersect with vehicle 201) can be ignored. Sensor data for objects approaching vehicle 201 can be sent to neural network module 208.

Neural network module 208 can receive filtered sensor data for objects approaching vehicle 201. Neural network module 208 can process sensor data for each approaching object to determine the likelihood of the object being a threat to occupants of vehicle 201. Neural network module 208 can classify each approaching object as a threating or not-threatening object. Alternately, neural network module 208 can calculate a threat probability for each approaching object.

Neural network module 208 can include a neural network architected in accordance with a multi-layer (or "deep") model. A multi-layer neural network model can include an input layer, a plurality of hidden layers, and an output layer. A multi-layer neural network model may also include a loss layer. For classification of sensor data (e.g., an image), values in the sensor data (e.g., pixel-values) are assigned to input nodes and then fed through the plurality of hidden layers of the neural network. The plurality of hidden layers can perform a number of non-linear transformations. At the end of the transformations, an output node yields a value that corresponds to the class (e.g., threat or non-threat) inferred by the neural network.

The neural network can be trained to distinguish between desired classes, such as, for example, non-threatening persons, persons with a mask, persons with a knife, persons with a gun, and other potential threats. The neural network can be trained to detect and track general pedestrians, in order to determine if they are approaching vehicle 201 and at what speed. The neural network can also be trained to detect if multiple persons are approaching vehicle 201 and distinguish between threats and non-threats.

Object classifications (and/or threat probabilities) for approaching objects can be presented at display 209. Even when an approaching object is non-threatening, vehicle occupants may desire to be aware of the approaching object. Object classifications for approaching objects (and/or threat probabilities) can also be sent to response module 211. Based on the classification (and/or threat probability) for an approaching object, response module 211 may cause vehicle 201 to respond in a specified manner.

For example, when an approaching object is classified as a threat and/or a threat probability for an approaching object is above a threshold, counter measures module 212 can activate counter measures to address the approaching object. Counter measures module 212 can instruct camera(s) 203 to record the approaching object. Counter measures module 212 can also transition the configuration of vehicle components 213, such as, for example, locking the doors of vehicle 201, activating the horn of vehicle 201, flashing headlights and tail lights of vehicle 201, sounding an audible warning in the cabin of vehicle 201, automatically make a phone call to 911, etc. When vehicle 201 includes autonomous driving capabilities, counter measures module 212 can cause vehicle 201 to drive away from an approaching object (possibly in combination with other counter measures).

Components of vehicle 201 can be connected to one another over (or be part of) a network, such as, for example, a PAN, a LAN, a WAN, a controller area network (CAN) bus, and even the Internet. Accordingly, the components of vehicle 201, as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Vehicle 201 can include a heterogeneous computing platform having a variety of different types and numbers of processors. For example, the heterogeneous computing platform can include at least one Central Processing Unit (CPU), at least one Graphical Processing Unit (GPU), and at least one Field Programmable Gate Array (FPGA). Aspects of the invention can be implemented across the different types and numbers of processors.

Figure 3:
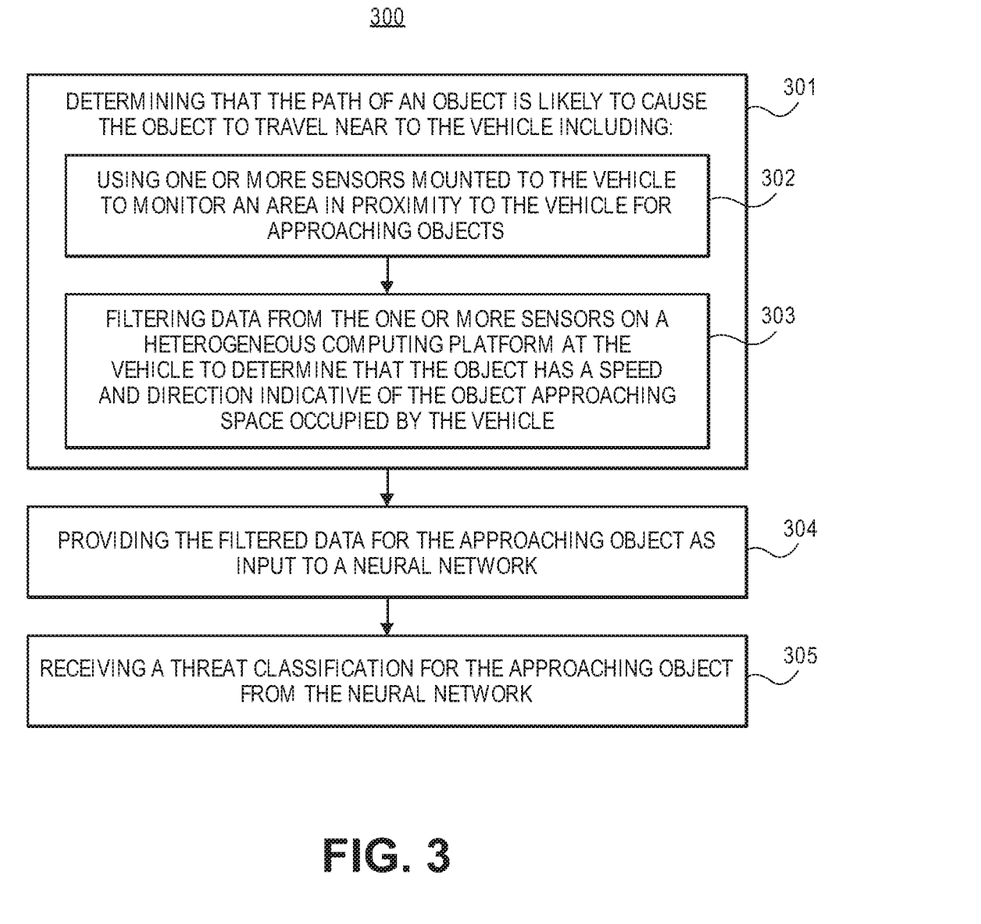
FIG. 3 illustrates a flow chart of an example method for detecting physical threats approaching a vehicle.

FIG. 3 illustrates a flow chart of an example method 300 for detecting physical threats approaching a vehicle. Method 300 will be described with respect to the components and data of computer architecture 200.

Method 300 includes determining that the path of an object is likely to cause the object to travel near to the vehicle (301). For example, vehicle 201 can determine that the path of approaching object 221 is likely to cause approaching object 221 to travel near to vehicle 201.

Determining that the path of an object is likely to cause the object to travel near to the vehicle includes using one or more sensors mounted to the vehicle to monitor an area in proximity to the vehicle for approaching objects (302). For example, external sensors 202 can monitor area 231 for approaching objects. In one aspect, area 231 is a 360-degree area around vehicle 201. As area 231 is monitored, external sensors 202 can generate sensor data 222 from sensing objects within area 231. Sensor data 222 can include the optical flow (i.e., speed and direction) of approaching object 221 (as well as the optical flow of any other objects within area 231).

Determining that the path of an object is likely to cause the object to travel near to the vehicle includes filtering data from the one or more sensors on a heterogeneous computing platform at the vehicle to determine that the object has a speed and direction indicative of the object approaching space occupied by the vehicle (303). For example, filter 207 can filter sensor data 222 into filtered sensor data 223. Filtered sensor data 223 includes sensor data for any objects having an optical flow (e.g., speed and direction) indicative of the object approaching space occupied by vehicle 201. For example, filtered sensor data 223 can include the speed and direction of approaching object 221. The speed and direction of approaching object 221 can indicate that the path of approaching object 221 is likely to intersect with space occupied by vehicle 201.

Method 300 includes providing the filtered data for the approaching object as input to a neural network (304). For example, filter 207 can provide filtered sensor data 223 as input to neural network module 208. Neural network module 208 can process filtered sensor data 223 to infer object classification 224 (e.g., threat or non-threat) for approaching object 221. Neural network module 208 can also process filtered sensor data 223 to infer object classifications for other objects approaching vehicle 201. Object classification 224 can be sent to display 209 and response module 211.

Method 300 includes receiving a threat classification for the approaching object from the neural network (305). For example, display 209 and response module 211 can receive object classification 224 for approaching object 221. Display 209 can present object classification 224 to the occupants of vehicle 201 to indicate: (a) that approaching object 221 is approaching vehicle 201 and (2) whether or not approaching object 221 is a threat. Based on object classification 224, response module 211 may or may not initiate a response. When object classification 224 indicates that approaching object 221 is not a threat (e.g., approaching object 221 is classified as a harmless pedestrian), response module 211 may take no further action.

On the other hand, when object classification 224 indicates that approaching object 221 is a threat (e.g., approaching object 221 is classified as a person wearing a mask and/or holding a weapon), response module 211 can instruct counter measures module 212 to initiate one or more counter measures to address the threat. In response, counter measures module 212 can send record command 227 to camera(s) 203. Record command 227 instructs camera(s) 203 to record the approach of approaching object 221. Counter measures module 212 can also send counter measure commands 226 to vehicle components 213. Counter measure commands 226 can instruct vehicle components 213 to take one or more counter measures to address the threat posed by approaching object 221. Counter measures can include locking the doors of vehicle 201, activating the horn of vehicle 201, flashing headlights and/or tail lights of vehicle 201, sounding an audible warning in the cabin of vehicle 201, automatically make a phone call to 911, etc. When vehicle 201 includes autonomous driving capabilities, counter measures module 212 can cause vehicle 201 to drive away from approaching object 221 (possibly in combination with other counter measures).

Aspects of the invention are beneficial to civilians and first responders alike. Both civilians and first responders may perform activities inside the cabin of their vehicle unrelated to driving. These activities may require sufficient attention such that they are unable to simultaneously perform the activities and monitor approaching objects in the vicinity of their vehicle. For example, a civilian driver may pull over and park a vehicle to review a map. During review of the map, the driver can be alerted to an approaching person wearing a mask. Similarly, a police office may be parked to write a report. While writing the report, the police officer can be alerted to an approaching person with a weapon.

Figure 4A:
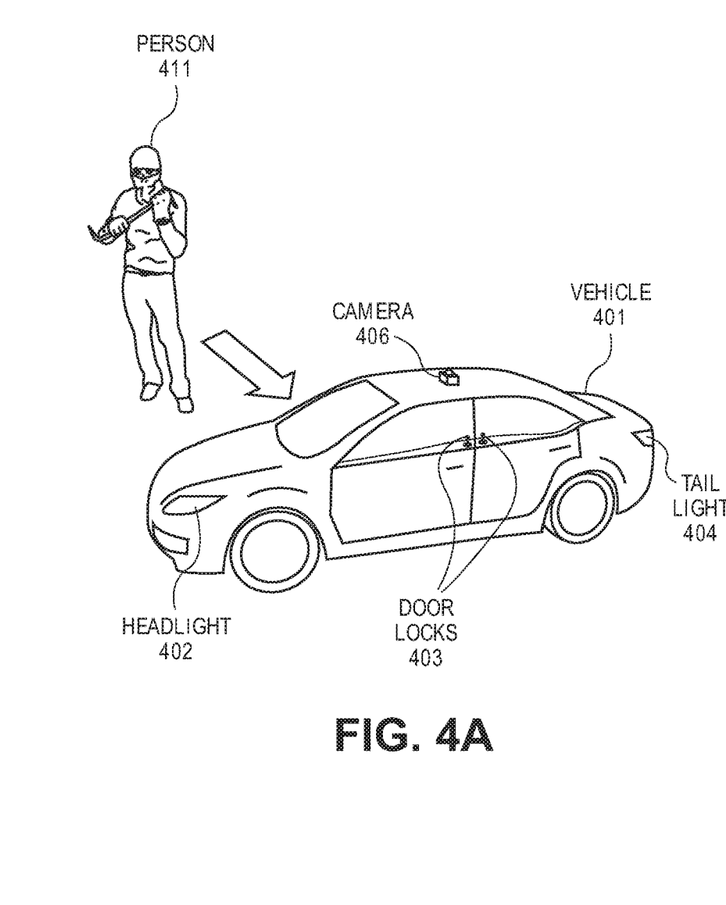
FIGS. 4A and 4B illustrate an example of a vehicle activating counter measures to respond to an approaching threat.
Figure 4B:
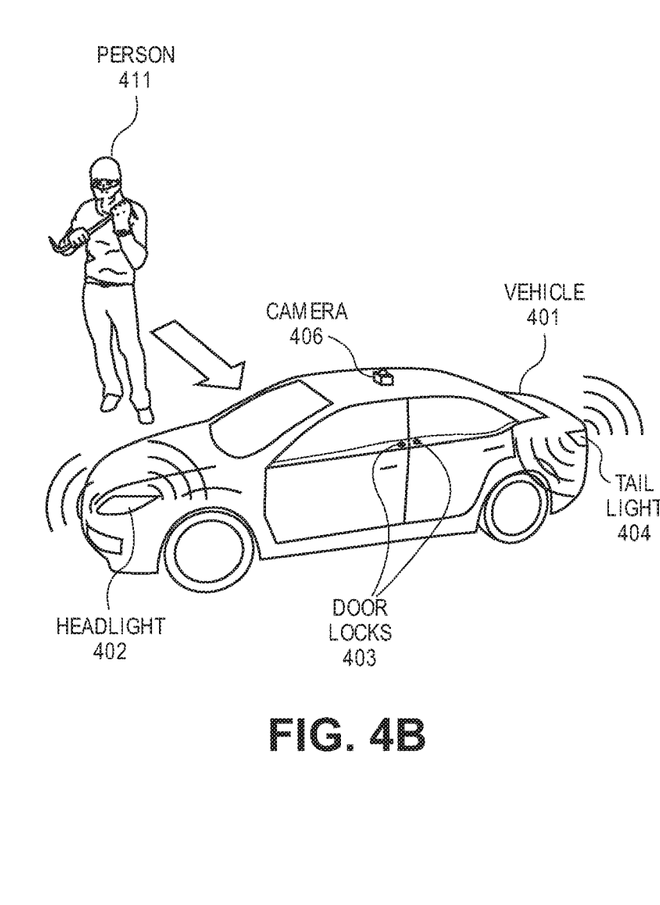

FIGS. 4A and 4B illustrate an example of a vehicle 401 activating counter measures to respond to an approaching threat. As depicted in FIG. 4A, person 411 is approaching vehicle 401. Camera 406 (a 360-degree camera) can capture an image of person 411. A neural network within vehicle 401 can process the image to classify person 411 as a threat. Turning to FIG. 4B, in response to person 411 being classified as a threat, vehicle 401 can activate door locks 403 and flash headlights 402 and tail lights 404.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, sensor data, filtered sensor data, object classifications, counter measure commands, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, sensor data, filtered sensor data, object classifications, counter measure commands, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method for use at a vehicle, the method comprising:
   determining that the path of a first object is likely to cause the first object and a corresponding second object to travel near the vehicle based on filtered sensor data from one or more sensors externally mounted on the vehicle;
   providing the filtered sensor data as input to a neural network;
   receiving a threat classification from the neural network classifying the first object and the corresponding second object collectively as a non-vehicular threat to an occupant of the vehicle;
   indicating the threat classification in the vehicle cabin; and
   automatically maneuvering the vehicle to get away from the first object and the second object.

2. The method of claim 1, wherein receiving a threat classification comprises receiving an indication that the first object is a person and the corresponding second object is a weapon possessed by the person.

3. The method of claim 1, wherein receiving a threat classification comprises receiving an indication that a weapon is approaching the vehicle.

4. The method of claim 1, wherein receiving a threat classification comprises receiving an indication that the first object is a person and the corresponding second object is a mask worn by the person.

5. The method of claim 1, further comprising activating counter measures to deter the non-vehicular threat.

6. The method of claim 1, wherein receiving a threat classification comprises receiving an indication that the first object is a dog and the corresponding second object is the dog's teeth.

7. A method for use at a vehicle, the method comprising:
determining that the path of an object is likely to cause the object to travel near to the vehicle, including:
using one or more sensors mounted to the vehicle to monitor an area in proximity to the vehicle for approaching objects; and
filtering data from the one or more sensors on a heterogeneous computing platform at the vehicle to determine that the object has a speed and direction indicative of the object approaching space occupied by the vehicle;
providing the filtered data for the approaching object as input to a neural network;
receiving an indication from the neural network that the approaching object and a second object associated with the approaching object collectively represent a non-vehicular threat to a vehicle occupant based at least in part on identification of the second object; and
activating counter measures at the vehicle to address the non-vehicular threat, including automatically attempting to maneuver the vehicle to take the vehicle occupant away from both the approaching object and the second object.

8. The method of claim 7, wherein activating counter measures at the vehicle to address the non-vehicular threat comprises automatically making a phone call to emergency services.

9. The method of claim 7, wherein receiving an indication from the neural network that the approaching object and a second object associated with the approaching object collectively represents a non-vehicular threat comprises receiving a threat probability from the neural network.

10. The method of claim 7, wherein using one or more sensors mounted to the vehicle to monitor an area in proximity to the vehicle for approaching objects comprises using at least two of: a camera, a LIDAR sensor, and a sound based object detector to monitor an area in proximity to the vehicle for approaching objects.

11. The method of claim 10, wherein filtering data from the one or more sensors on a heterogeneous computing platform comprises filtering data from the plurality of sensors on at least two of: a Central Processing Unit (CPU), a Graphical Processing Unit (GPU), and a Field Programmable Gate Array (FPGA) in the vehicle.

12. The method of claim 7, wherein filtering data from the one or more sensors comprises filtering the data using one or more of: a Kalman filter and a Particle Filter.

13. The method of claim 7, wherein filtering data from the one or more sensors comprises determining an optical flow of the non-vehicular threat.

14. The method of claim 7, wherein receiving an indication from the neural network that the approaching object and a second object associated with the approaching object collectively represent a non-vehicular threat to the vehicle occupant comprises receiving an indication that the approaching object is a person and the associated second object is one of: a weapon in possession of the person or a mask in possession of the person.

15. The method of claim 7, wherein activating counter measures at the vehicle comprises activating counter measures including one or more of: recording the approaching object, locking the doors of the vehicle, issuing an audible warning in the vehicle cabin, honking a horn of the vehicle, or flashing lights of the vehicle.

16. The method of claim 1, further comprising automatically activating counter measures at the vehicle including one or more of: recording the first object, locking the doors of the vehicle, calling emergency services, issuing an audible warning in the vehicle cabin, honking a horn of the vehicle, or flashing lights of the vehicle.

17. A vehicle, the vehicle comprising:
one or more externally mounted sensors for monitoring an area in proximity to the vehicle;
one or more processors;
system memory coupled to one or more processors, the system memory storing instructions that are executable by the one or more processors;
the one or more processors configured to execute the instructions stored in the system memory to:
determine that the path of an object is likely to cause the object and a second object to travel near to the vehicle, including:
use the one or more externally mounted sensors to monitor the area in proximity to the vehicle for approaching objects; and
filter data from the one or more sensors to determine that the object has a speed and direction indicative of the object approaching space occupied by the vehicle;
provide the filtered data as input to a neural network;
receive a threat probability from the neural network indicating a probability that the object and the second object collectively represent a non-vehicular threat to a vehicle occupant; and
control one or more vehicle components, wherein the one or more vehicle components maneuver the vehicle to get away from both the object and the second object.

18. The vehicle of claim 17, wherein the one or more externally mounted sensors include one or more of: a camera, a LIDAR sensor, a RADAR sensor, and an ultrasonic sensor.

19. The vehicle of claim 17, wherein the one or more processors configured to execute the instructions to receive an indication from the neural network that the approaching object represents a non-vehicular threat to the vehicle occupants comprises the one or more processors configured to execute the instructions to receive an indication that the approaching object is a person and the associated second object is one of: a weapon in possession of the person or a mask in possession of the person.

20. The vehicle of claim 17, wherein the one or more processors configured to execute the instructions to activate counter measures at the vehicle comprises the one or more processors configured to execute the instructions to activate counter measures including one or more of: recording the object, locking the doors of the vehicle, issuing an audible warning in the vehicle cabin, honking a horn of the vehicle, or flashing lights of the vehicle.

* * * * *